US008493708B2

(12) United States Patent
Lu

(10) Patent No.: US 8,493,708 B2
(45) Date of Patent: Jul. 23, 2013

(54) CAPACITOR STRUCTURE

(75) Inventor: Ning Lu, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 13/031,392

(22) Filed: Feb. 21, 2011

(65) Prior Publication Data

US 2012/0212877 A1 Aug. 23, 2012

(51) Int. Cl.
*H01G 4/005* (2006.01)
*H01G 4/012* (2006.01)
*H01G 4/008* (2006.01)
*H01G 4/236* (2006.01)

(52) U.S. Cl.
USPC ........ 361/301.4; 361/303; 361/304; 361/305; 361/307

(58) Field of Classification Search
USPC ................. 361/303, 304, 305, 307, 301.4
See application file for complete search history.

(56) References Cited

U.S. PATENT DOCUMENTS

| | | | |
|---|---|---|---|
| 3,904,996 A | 9/1975 | Rosenfeld | |
| 5,172,299 A | 12/1992 | Yamada et al. | |
| 5,583,359 A | 12/1996 | Ng et al. | |
| 6,819,542 B2 * | 11/2004 | Tsai et al. | 361/304 |
| 7,161,794 B2 | 1/2007 | Galvagni et al. | |
| 2003/0183884 A1 * | 10/2003 | Miyazawa | 257/401 |
| 2008/0099880 A1 | 5/2008 | Cho et al. | |
| 2008/0305606 A1 | 12/2008 | Chinthakindi | |
| 2009/0097186 A1 * | 4/2009 | Topaloglu | 361/306.3 |
| 2011/0049674 A1 * | 3/2011 | Booth et al. | 257/532 |

FOREIGN PATENT DOCUMENTS

| | | |
|---|---|---|
| JP | 08316096 | 11/1996 |
| JP | 2001267503 | 9/2001 |

OTHER PUBLICATIONS

IBM, "Stacked Metal Finger Capcitors Providing High Capacitance Density and High Quality Factors", Nov. 3, 2009, IPCOM000189290D, 6 pages.

* cited by examiner

*Primary Examiner* — Eric Thomas
*Assistant Examiner* — Arun Ramaswamy
(74) *Attorney, Agent, or Firm* — Richard M. Kotulak; Hoffman Warnick LLC

(57) ABSTRACT

The disclosure relates generally to capacitor structures and more particularly, to capacitor structures having interdigitated metal fingers. Metal finger capacitors may have at least one layer, the at least one layer including: a first set of fingers, wherein each finger of the first set includes an end integrally connected to a bus segment of a first bus; a second set of fingers interdigitated with the first set of fingers, wherein each finger of the second set includes an end integrally connected to a bus segment of a second bus; an in port integrally connected to the first bus and an out port integrally connected to the second bus; and wherein a width of the first and second bus is non-uniform across a length of the first and second bus.

20 Claims, 17 Drawing Sheets

CAPACITOR STRUCTURE

TECHNICAL FIELD

The disclosure relates generally to capacitor structures and more particularly, to capacitor structures having interdigitated metal fingers.

BACKGROUND

Capacitors are used in integrated circuit designs to achieve different functions such as dynamic random access memory, bypassing, filtering, and etc. Metal finger capacitors (MFCAP) are an example of capacitor devices used in logic and analog semiconductor technologies. As technology scaling continues, achieving a higher quality factor Q in MFCAPs while maintaining the MFCAP's capacitance density and total capacitance remains a challenge.

SUMMARY

An aspect of the present invention relates to a metal finger capacitor (MFCAP) comprising at least one layer, the at least one layer including: a first set of fingers, wherein each finger of the first set includes an end integrally connected to a bus segment of a first bus; a second set of fingers interdigitated with the first set of fingers, wherein each finger of the second set includes an end integrally connected to a bus segment of a second bus; an in port integrally connected to the first bus and an out port integrally connected to the second bus; and wherein a width of the first and second bus is non-uniform across a length of the first and second bus.

A second aspect of the present invention relates to a metal finger capacitor (MFCAP) comprising at least one layer, the at least one layer including: a first set of fingers, wherein each finger of the first set includes an end integrally connected to a bus segment of a first bus; a second set of fingers interdigitated with the first set of fingers, wherein each finger of the second set includes an end integrally connected to a bus segment of a second bus; an in port integrally connected to the first bus and an out port integrally connected to the second bus; and wherein widths of bus segments of the first and the second buses increase the more proximate the bus segments are to the in port and the out port.

The illustrative aspects of the present invention are designed to solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
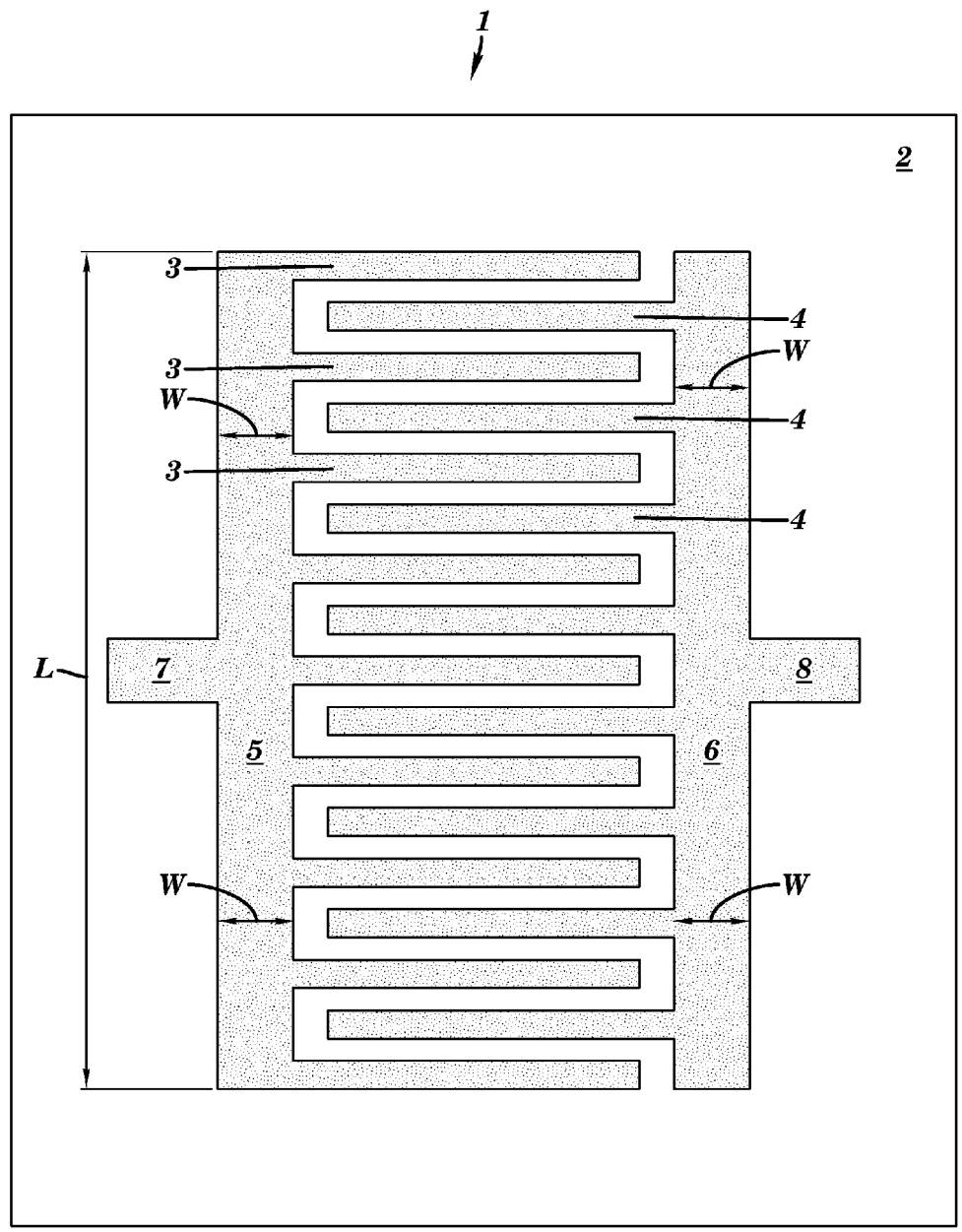
FIG. 1 depicts a plan view of an embodiment of a metal finger capacitor (MFCAP) according to the prior art.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

It has been discovered that various designs of metal finger capacitors (MFCAP), and in particular, designs of interdigitated metal fingers therein may increase the quality factor Q of the MFCAP while being able to maintain capacitance density and process yield of the MFCAP. Embodiments of designs for increasing the quality factor Q of the MFCAP may include having a first and second bus wherein the width of each is non-uniform across a length of the first and second bus. Another design embodiment may include the MFCAP having bus segments of the first and second bus wherein widths of the bus segments increase the more proximate the bus segments are to an in port and out port of the MFCAP.

A plan view of an embodiment of a metal finger capacitor (MFCAP) according to the prior art is depicted in FIG. 1. As shown in FIG. 1, MFCAP 1 includes at least one layer 2. At least one layer 2 may include a first set of fingers 3 that may be integrally connected to a first bus 5. At least one layer 2 may also include a second set of fingers 4 that may be connected to second bus 6. First set of fingers 3 may be interdigitated with second set of fingers 4, i.e., they may be interlinked so as to resemble fingers of two hands being locked together. MFCAP 1 may also include an in port 7 and an out port 8 integrally connected to first bus 5 and second bus 6 respectively. First bus 5 and second bus 6 include one bus segment each that has a width W that is uniform across a length L of each bus 5 and 6.

Figure 2:
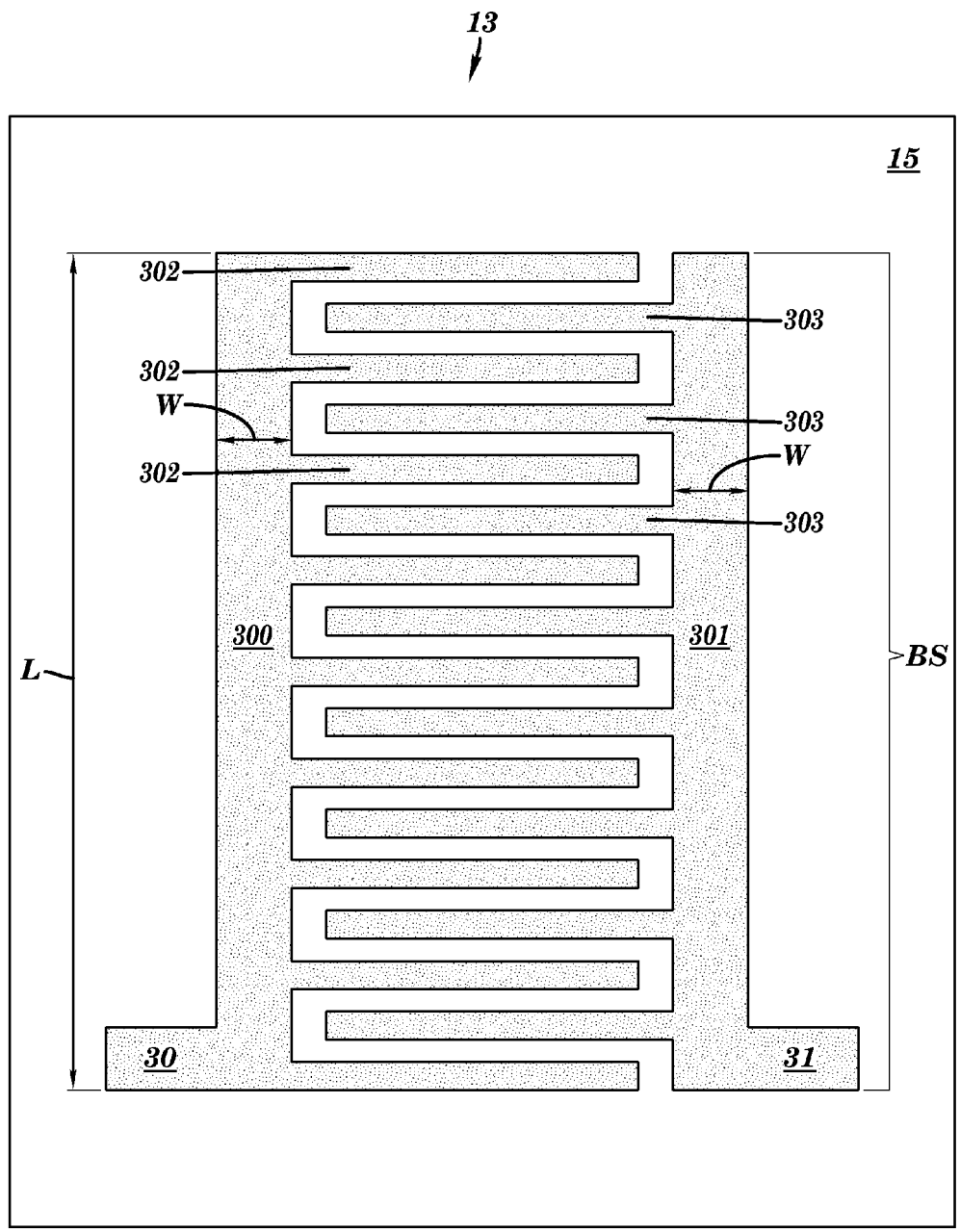
FIG. 2 depicts a plan view of an embodiment of another MFCAP according to the prior art.

A plan view of an embodiment of another MFCAP 13 according to the prior art is depicted in FIG. 2. As shown in FIG. 2, MFCAP 13 includes at least one layer 15. At least one layer 15 may include a first set of fingers 302 integrally connected to a first bus 300 and a second set of fingers 303 integrally connected to a second bus 301. First set of fingers 302 may be interdigitated with second set of fingers 303. MFCAP 13 may also include an in port 30 and an out port 31 integrally connected to first bus 300 and second bus 301 respectively. First bus 300 and second bus 301 each include one bus segment BS that has a width W that is uniform across a length L of each bus 300 and 301.

Figure 3:
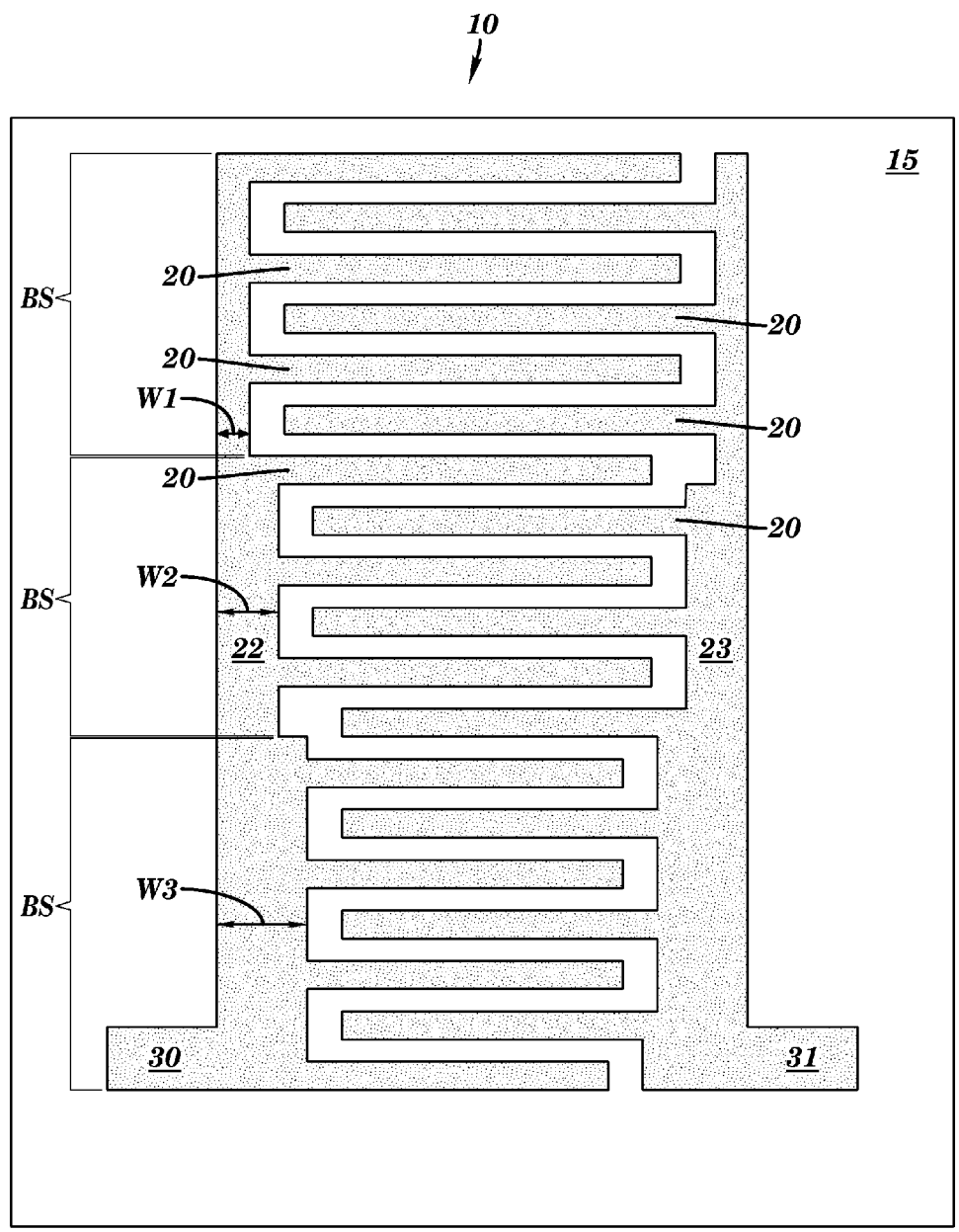
FIG. 3 depicts a plan view of an embodiment of a MFCAP, in accordance with aspects of the present invention.

A plan view of an embodiment of a MFCAP 10 is depicted in FIG. 3, in accordance with aspects of the present invention. As shown in FIG. 3 includes at least one layer 15, first set and second set of fingers 20 and 21 respectively, first bus and second bus 22 and 23 respectively, in port 30, out port 31, and bus segments BS that have non-uniform widths W1, W2, and W3 across a length L of each bus 22 and 23. Various embodiments of the aforementioned will be discussed later in the specification.

Design characteristics of aspects of the present invention relating to an increased quality factor Q will be discussed and compared to the prior art. Referring to FIGS. 2 and 3, MFCAPs 13 and 10 may have the same finger width, the same finger-to-finger space, the same finger-to-bus segment space, the same total finger length, and the same bus area, which may lead to the same total capacitance $C_{tot}$ for MFCAPs 13 and 10. The effective resistance of an MFCAP may consist of two parts: the resistance present in the fingers and the resistance present in the two buses of the MFCAP. When the number of fingers present in the MFCAP is large, which is typical, the resistance in the fingers may be much smaller than the resistance in the two buses. The bus resistance of MFCAP 10 may be smaller than the bus resistance of MFCAP 13 for a number of reasons. The more proximate a bus segment may be to an in port or an out port of an MFCAP, the greater amount of electric current present in that particular bus segment may be. In MFCAP 10, the width W of the buses, i.e., the bus segments BS, becomes wider when a bus segment is more proximate to in-port 30 or to out-port 31 of MFCAP 10.

For comparison, let the middle width W2 of buses 22 and 23 of MFCAP 10 be equal to the width W of buses 300 and 301 of MFCAP 13; the width W3 of the wider bus segment of buses 22 and 23 of MFCAP 10 be larger than the width W of buses 300 and 301 of MFCAP 13; and the width W1 of the narrow bus segment of buses 22 and 23 of MFCAP 10 be smaller than the width W of buses 300 and 301 of MFCAP 13 such that W1+W3=2×W2=2 W (1). Also let the length of the bus segment having width W1 be equal to the length of the bus segment having width W3.

Relation (1) may explain how the total capacitance and how the finger portion of resistance in MFCAP 13 and MFCAP 10 may be kept the same. The amount of resistance reduction in bus segments 22 and 23 having a width W3 may be attributed to W3 being greater than W and that the amount of resistance reduction is more than the amount of resistance increase in the bus segments having a width W2 and W1. Consequently, the bus resistance of MFCAP 10 may be smaller than the bus resistance of MFCAP 13. Thus, the effective resistance $R_{eff}$ of MFCAP 10 may be smaller than $R_{eff}$ of MFCAP 13. In turn, this may lead to a higher quality factor Q for MFCAP 10 than the quality factor Q for MFCAP 13 as shown by equation (2) below.

$$Q = \frac{1}{2\pi f R_{eff} C_{tot}}, \quad (2)$$

wherein f is the frequency of an AC signal. Embodiments of additional MFCAPs representative of the improved design characteristics of aspects of the present invention are described herein.

Figure 4:
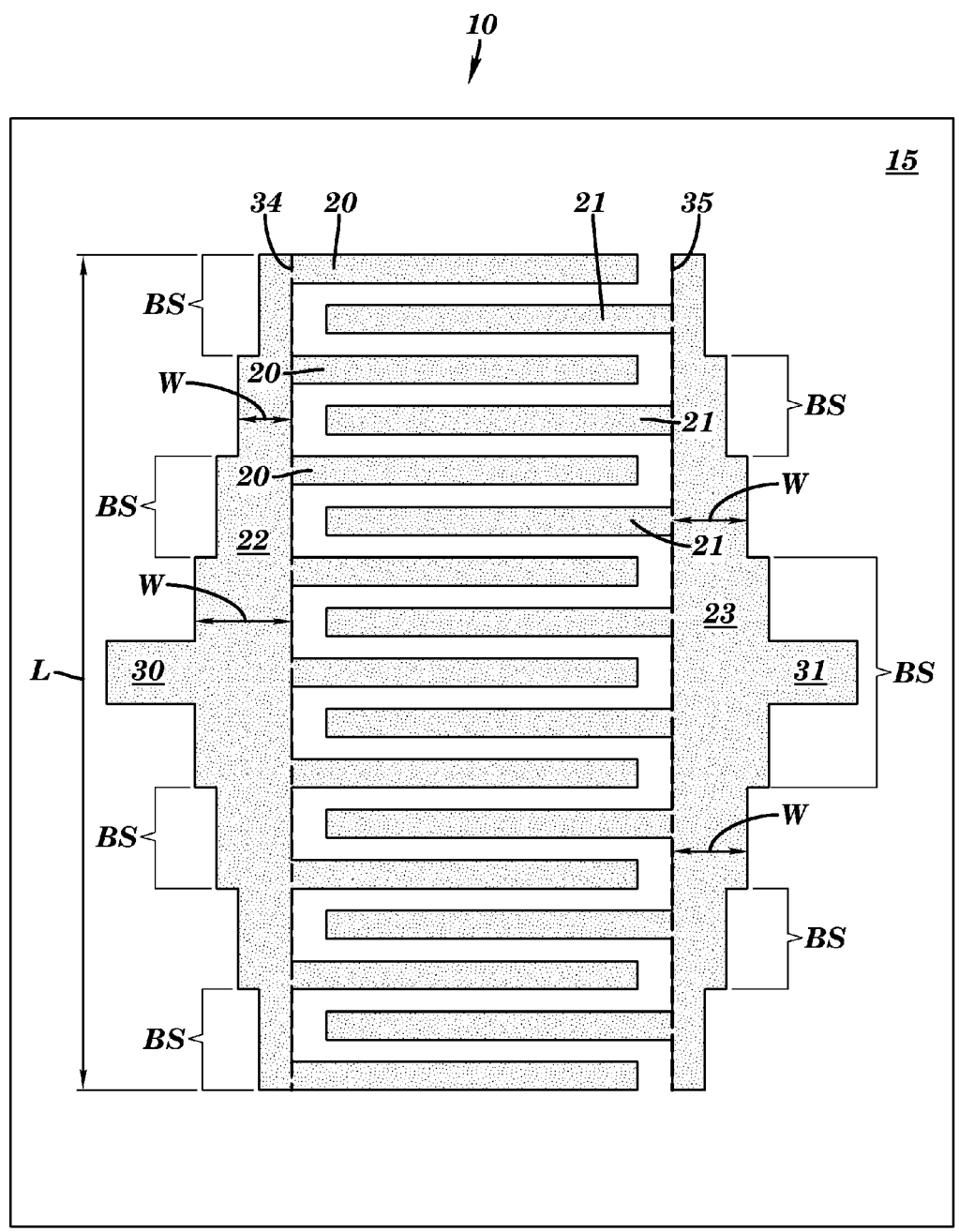
FIG. 4 depicts a plan view of another embodiment of a metal finger capacitor (MFCAP), in accordance with aspects of the present invention.

A plan view of another embodiment of a MFCAP is depicted in FIG. 4, in accordance with aspects of the present invention. As shown in FIG. 4, MFCAP 10 is includes at least one layer 15. At least one layer 15 may include a first set of fingers 20 in which each finger may be integrally connected to a first bus 22. At least one layer 15 may also include a second set of fingers 21 in which each finger may be integrally connected to a second bus 23. First set of fingers 20 may be interdigitated with second set of fingers 21. In an embodiment, approximately 10 fingers to approximately 1,000 fingers may be integrally connected to first bus 22 and approximately 10 fingers to approximately 1,000 fingers may be integrally connected to second bus 23.

MFCAP 10 may also include an in port 30 and an out port 31 integrally connected to a bus segment BS of first bus 22 and second bus 23 respectively. First bus 20 and second bus 23 may include a plurality of bus segments BS that have widths W that are non-uniform across a length L of buses 22 and 23. In an embodiment, the more proximate the bus segments BS are to in port 30 and out port 31, the greater the widths of the bus segments are.

In an embodiment, MFCAP 10 may have a configuration in which in port 30 and out port 31 may be integrally connected to a bus segment BS that may be approximately centered on length L of first bus 22 and second bus 23 respectively. MFCAP 10 may also concurrently have a second edge 34 of first bus 22 that may be substantially parallel to a second edge 35 of second bus 23 (both second edges 34 and 35 are denoted by hashed lines).

Figure 5:
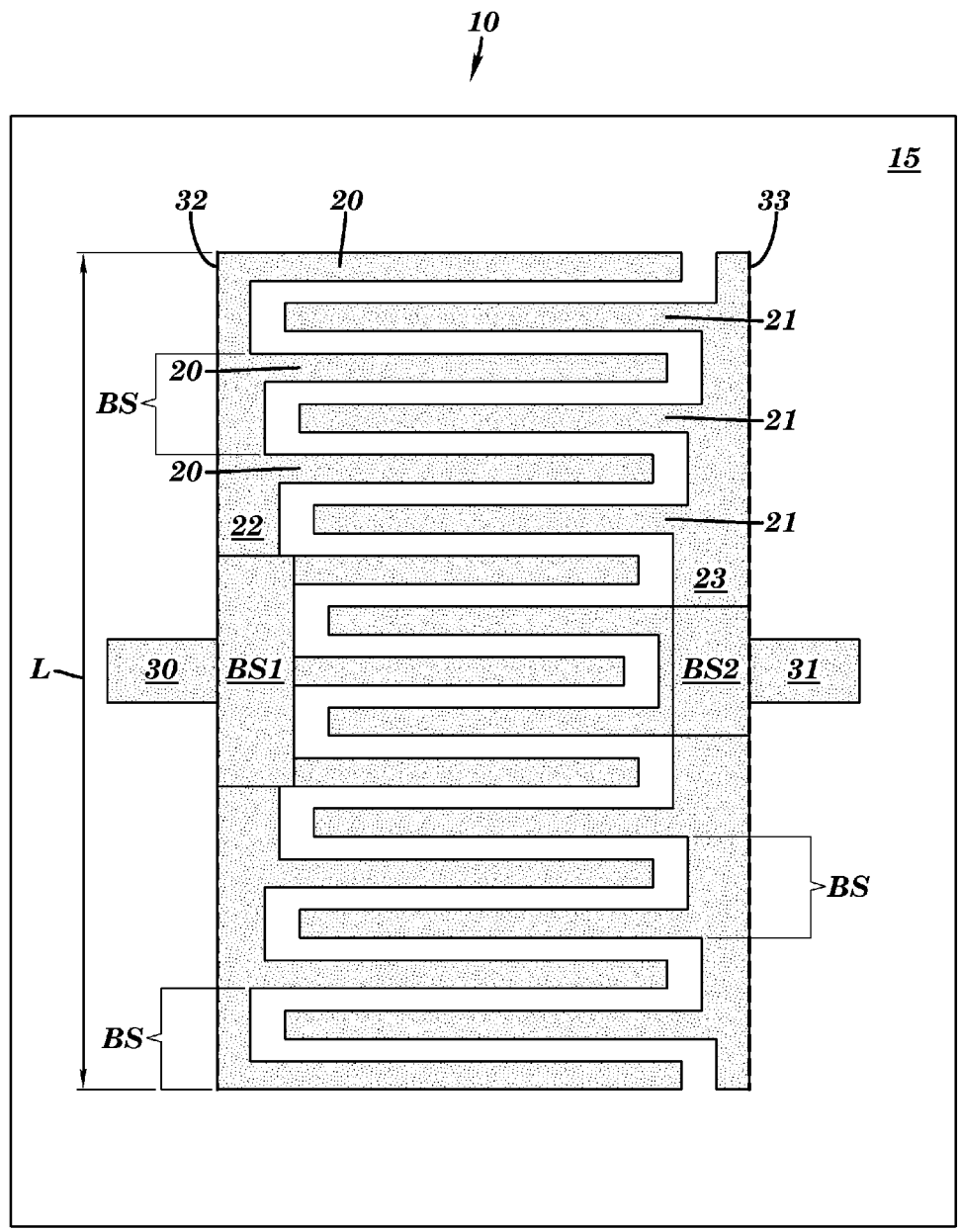
FIG. 5 depicts a plan view of another embodiment of a MFCAP, in accordance with aspects of the present invention.

A view of another embodiment of MFCAP 10 is depicted in FIG. 5, in accordance with aspects of the present invention. As shown in FIG. 5, MFCAP 10 includes a configuration in which in port 30 and port 31 may be integrally connected to a bus segment BS1 and BS2 respectively that may be approximately centered on length L of first bus 22 and second bus 23 respectively. MFCAP 10 may also concurrently have a first edge 32 of first bus 22 substantially parallel to a first edge 33 of second bus 23 (both first edges 32 and 33 are denoted by hashed lines).

Figure 6:
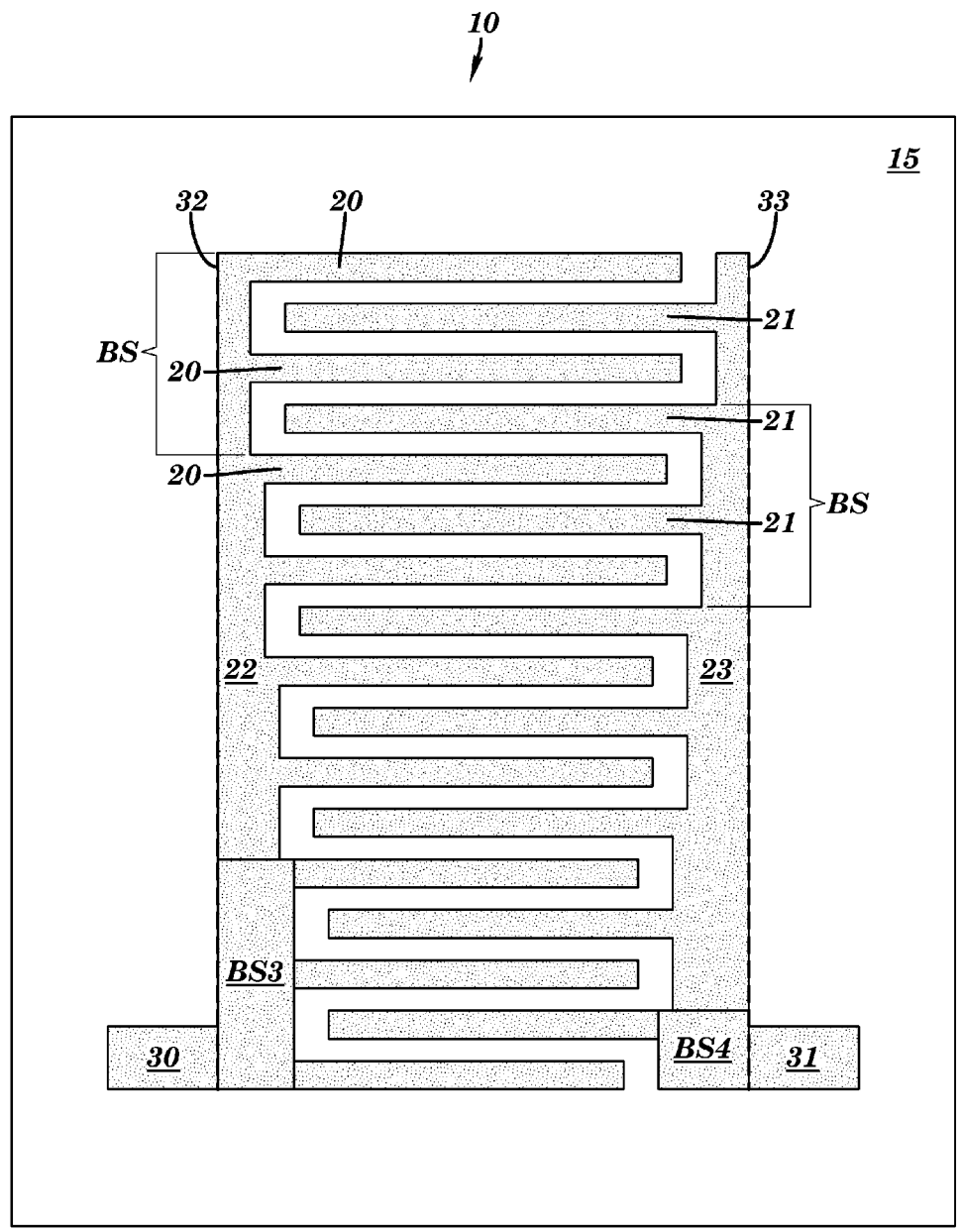
FIG. 6 depicts a plan view of another embodiment of a MFCAP, in accordance with aspects of the present invention.

A view of another embodiment of MFCAP 10 is depicted in FIG. 6, in accordance with aspects of the present invention. As shown in FIG. 6, MFCAP 10 includes a configuration in which in port 30 may be integrally connected to first edge 32 and a first end bus segment BS3 of first bus 22. Out port 31 may be integrally connected to first edge 33 and a first end bus segment BS4 that may be at the end of second bus 23. MFCAP 10 may also concurrently have first edge 32 substantially parallel to first edge 33.

Figure 7:
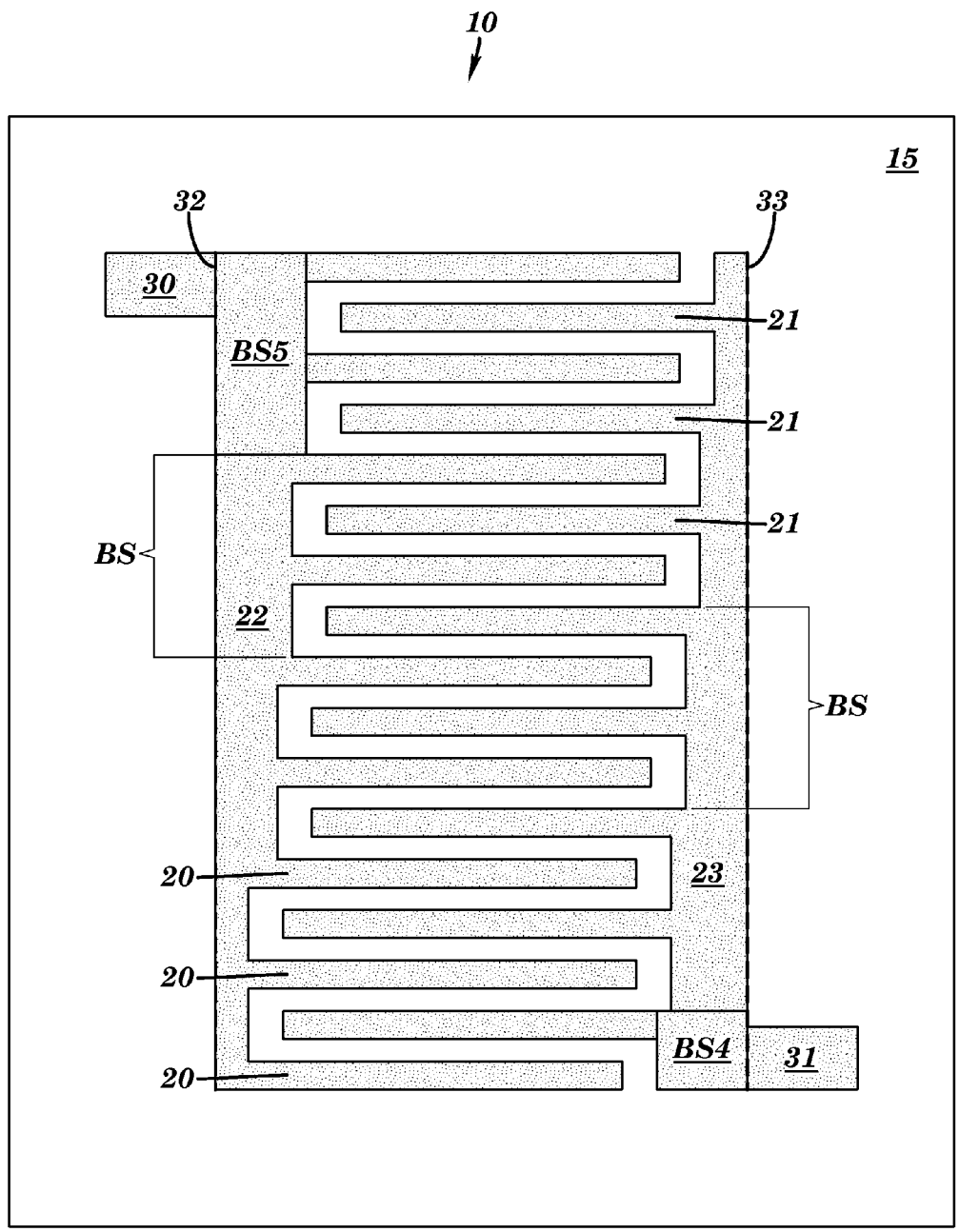
FIG. 7 depicts a plan view of another embodiment of a MFCAP, in accordance with aspects of the present invention.

A plan view of another embodiment of MFCAP 10 is depicted in FIG. 7, in accordance with aspects of the present invention. Referring to FIG. 7, MFCAP 10 is shown having a configuration in which in port 30 may be integrally connected to first edge 32 and a second end bus segment BS5 of first bus 22. Out port 31 may be integrally connected to first edge 33 and first end bus segment BS4 of second bus 23. MFCAP 10 may also concurrently have first edge 32 substantially parallel to first edge 33.

Figure 8:
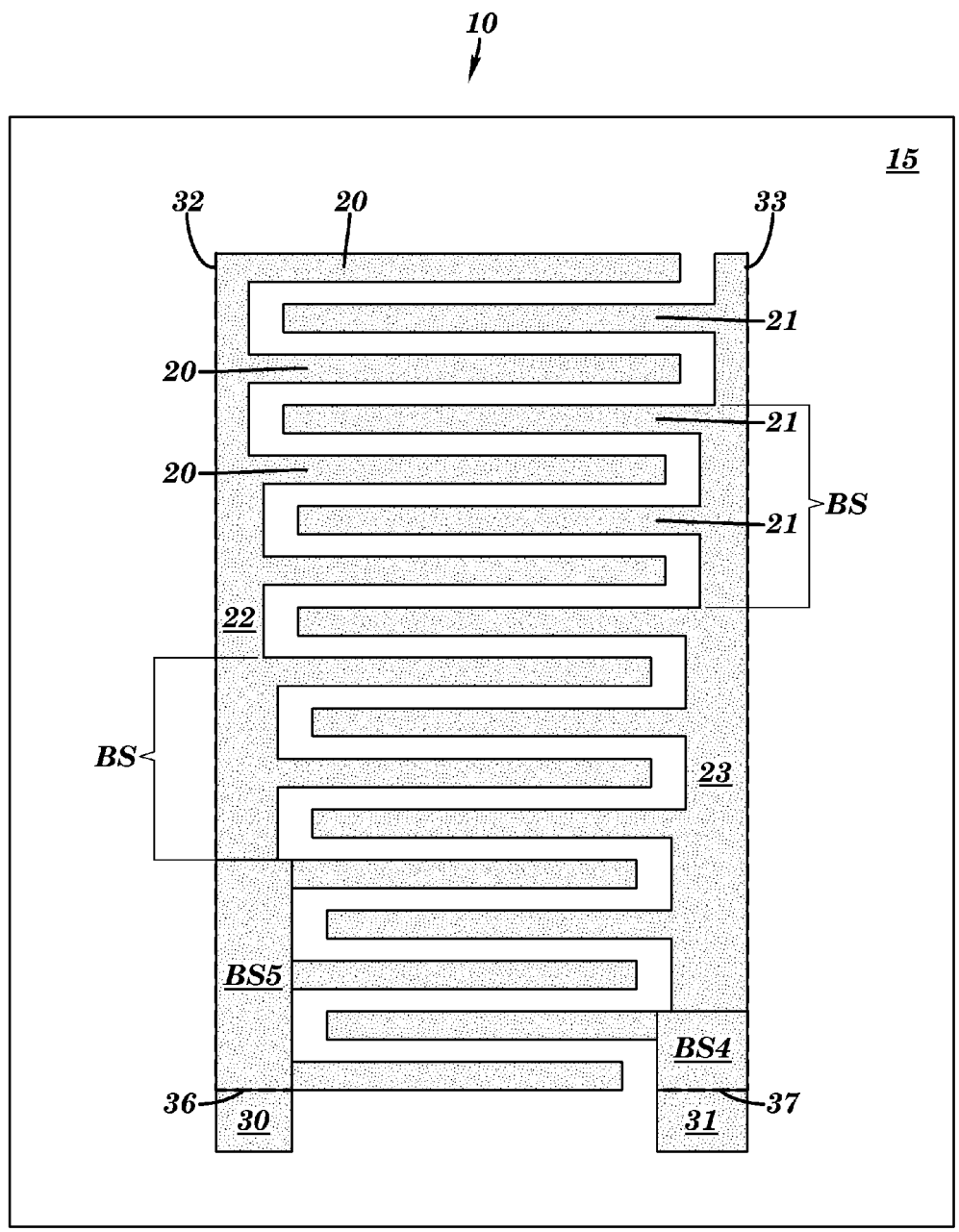
FIG. 8 depicts a plan view of another embodiment of a MFCAP, in accordance with aspects of the present invention.

A plan view of another embodiment of MFCAP 10 is depicted in FIG. 8, in accordance with aspects of the present invention. As shown in FIG. 8, MFCAP 10 includes a configuration in which in port 30 and out port 31 may be integrally connected to a first edge 36 of first end bus segment BS3 of first bus 22 and a first edge 37 of first end bus segment BS4 of second bus 23 respectively (both first edges 36 and 37 are denoted by hashed lines). MFCAP may also concurrently have first edge 32 of first bus 22 substantially parallel to first edge 33 of second bus 23.

Figure 9:
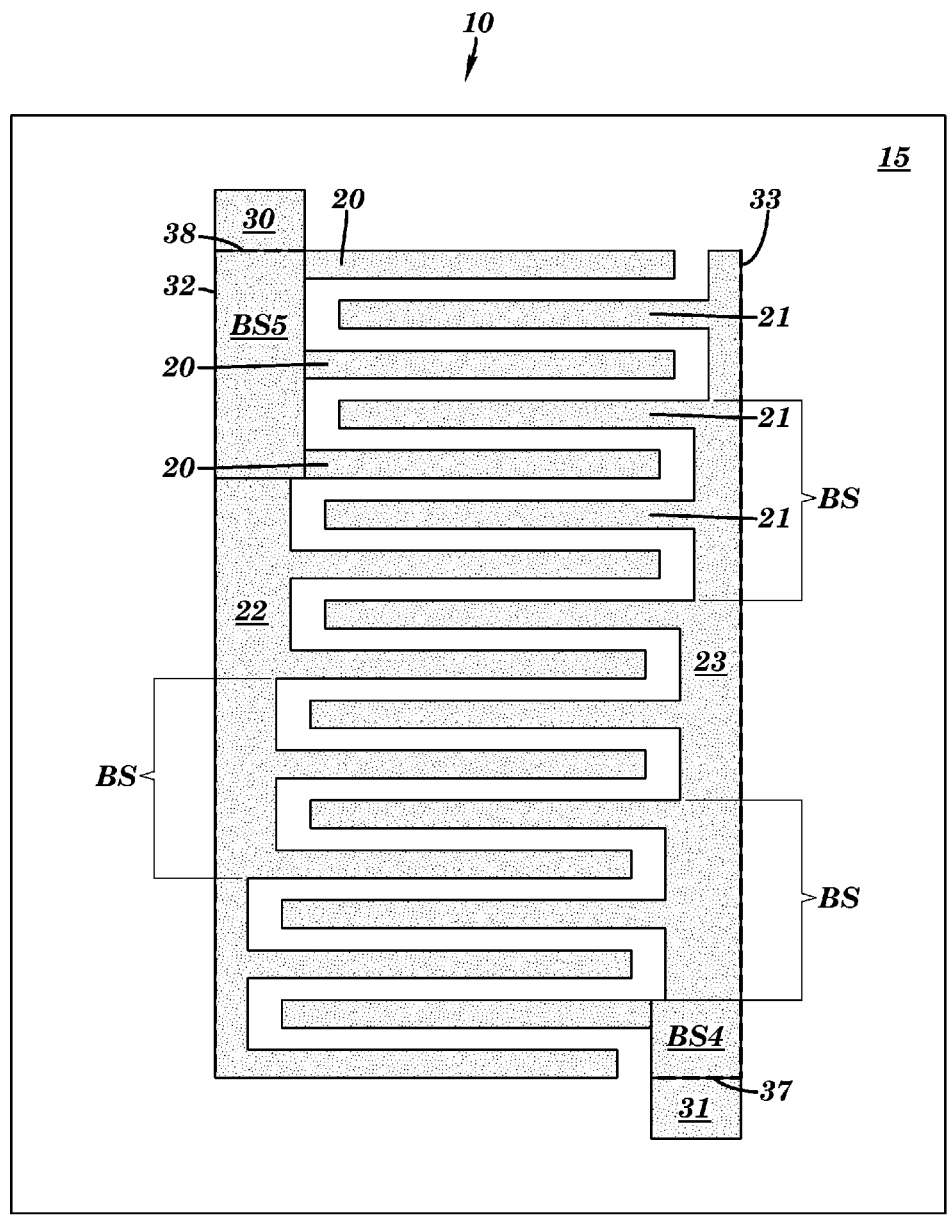
FIG. 9 depicts a plan view of another embodiment of a MFCAP, in accordance with aspects of the present invention.

A plan view of another embodiment of MFCAP 10 is depicted in FIG. 9, in accordance with aspects of the present invention. As shown in FIG. 9, MFCAP 10 includes a configuration in which in port 30 may be integrally connected to a first edge 38 of second end bus segment BS5 of first bus 22

(first edge 38 is denoted by a hashed line). Out port 31 may be integrally connected first edge 37 of first end bus segment BS4 of second bus 23. MFCAP 10 may also concurrently have first edge 32 substantially parallel to first edge 33.

Figure 10:
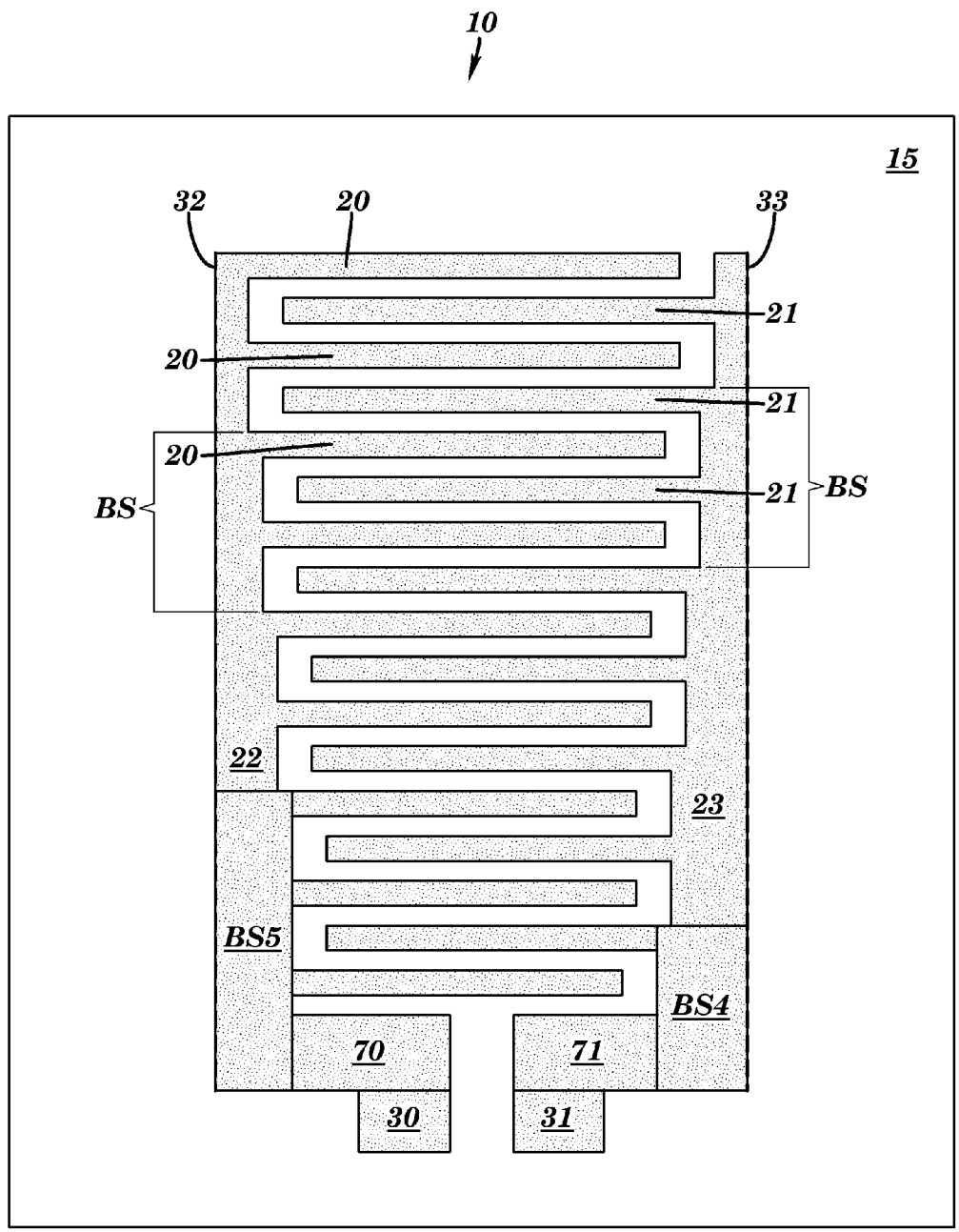
FIG. 10 depicts a plan view of another embodiment of a MFCAP, in accordance with aspects of the present invention.

A plan view of another embodiment of MFCAP 10 is depicted in FIG. 10, in accordance with aspects of the present invention. As shown in FIG. 10, MFCAP 10 may include a configuration in which in port 30 may be integrally connected to a first arm 70 of first end bus segment BS3 of first bus 22. Out port 31 may be integrally connected to a first arm 71 of first end bus segment BS4 of second bus 23. MFCAP 10 may also concurrently have first edge 32 of first bus 22 substantially parallel to first edge 33 of second bus 23.

Figure 11:
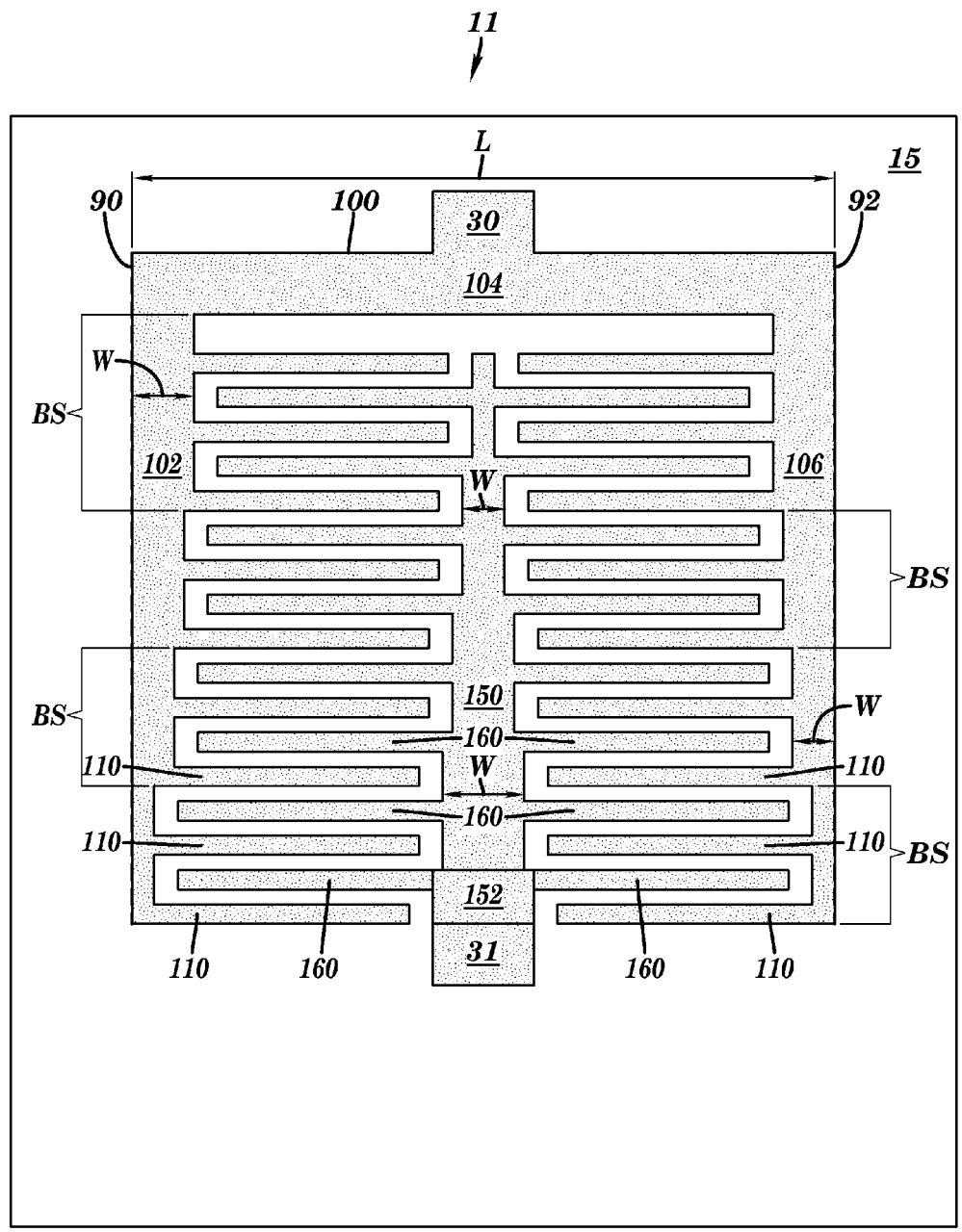
FIG. 11 depicts a plan view of another embodiment of a MFCAP, in accordance with aspects of the present invention.

A plan view of another embodiment of a MFCAP is depicted in FIG. 11, in accordance with aspects of the present invention. As shown in FIG. 11, MFCAP 11 includes at least one layer 15. At least one layer 15 may include a first bus 100 and a second bus 150 which may be approximately centered between sections 102 and 106 of first bus 100. First bus 100 may include a first set of fingers 110 in which each finger may be integrally connected to first bus 100 and second bus 150 may include a second set of fingers 160 in which each finger may be integrally connected to second bus 150. First set of fingers 110 may be interdigitated with second set of fingers 160. In an embodiment, first set of fingers 110 may include approximately 10 fingers to approximately 1,000 fingers integrally connected to first bus 100 and second set of fingers 160 may include approximately 10 fingers to approximately 1,000 fingers integrally connected to second bus 150.

MFCAP 11 may also include an in port 30 that may be integrally connected first bus 100 and an out port 31 that may be integrally connected to second bus 150. First bus 100 and second bus 150 may include a plurality of bus segments BS that have widths W that are non-uniform. In an embodiment, the widths W may increase the more proximate the respective bus segments BS are to in port 30 and out port 31 respectively.

In an embodiment, MFCAP 11 may have a configuration in which in port 30 may be integrally connected to and approximately centered on a length L of second section 104 of first bus 100 and out port 31 may be integrally connected to a first end bus segment 152 of second bus 150. MFCAP 11 may also concurrently have a first edge 90 and a second edge 92 of first bus 100 that may be substantially parallel (first edge 90 and second 92 are denoted by hashed lines).

Figure 12:
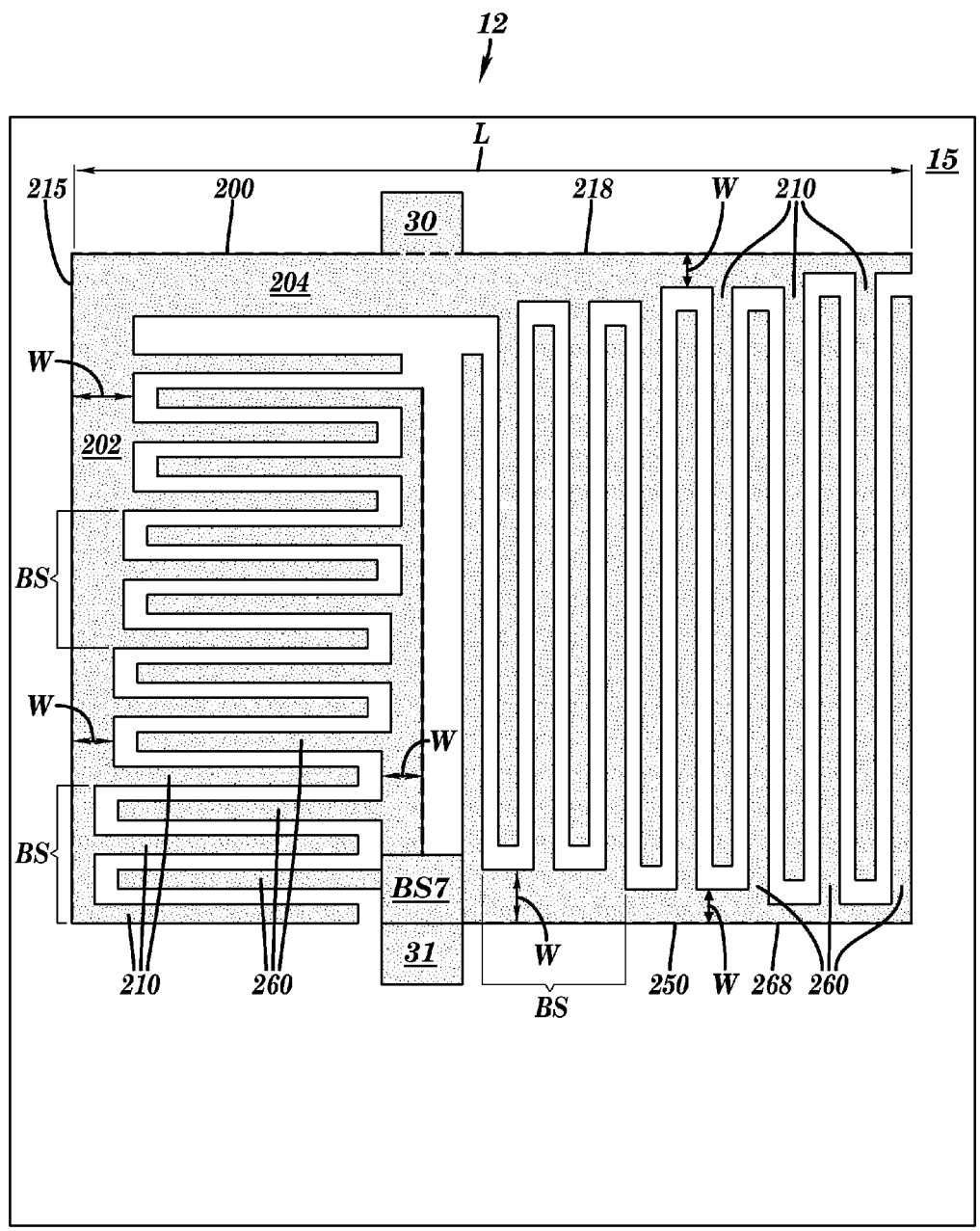
FIG. 12 depicts a plan view of another embodiment of a MFCAP, in accordance with aspects of the present invention.

A plan view of another embodiment of a MFCAP is depicted in FIG. 12, in accordance with aspects of the present invention. As shown in FIG. 12, MFCAP 12 may include at least one layer 15. At least one layer 15 may include a first bus 200 and a second bus 250 both of which may be substantially L-shaped. First bus 200 may include a first set of fingers 210 in which each finger may be integrally connected to first bus 200. Second bus 250 may include a second set of fingers 260 in which each finger may be integrally connected to second bus 250. First set of fingers 210 may be interdigitated with second set of fingers 260. In an embodiment, first set of fingers 210 may include approximately 10 fingers to approximately 1,000 fingers that may be integrally connected to first bus 200 and second set of fingers 260 may include approximately 10 fingers to approximately 1,000 fingers that may be integrally connected to second bus 250.

MFCAP 12 may also include an in port 30 and an out port 31 integrally connected to first bus 200 and second bus 250 respectively. First bus 200 and second bus 250 may include a plurality of bus segments BS that have widths W that may increase the more proximate the respective bus segments BS are to in port 30 and out port 31 respectively.

In an embodiment, MFCAP 12 may have a configuration in which in port 30 may be integrally connected to and approximately centered on a length L of second section 204 of first bus 200 and out port 31 may be integrally connected to a corner bus segment BS7 of second bus 250. MFCAP 12 may also concurrently have a first edge 215 of a first section 202 and a second edge 218 of second section 204 of first bus 200 that may be substantially parallel to a first edge 265 and a second edge 268 of second bus 250 respectively (edges 215, 218, 265, and 268 are denoted by hashed lines).

Figure 13:
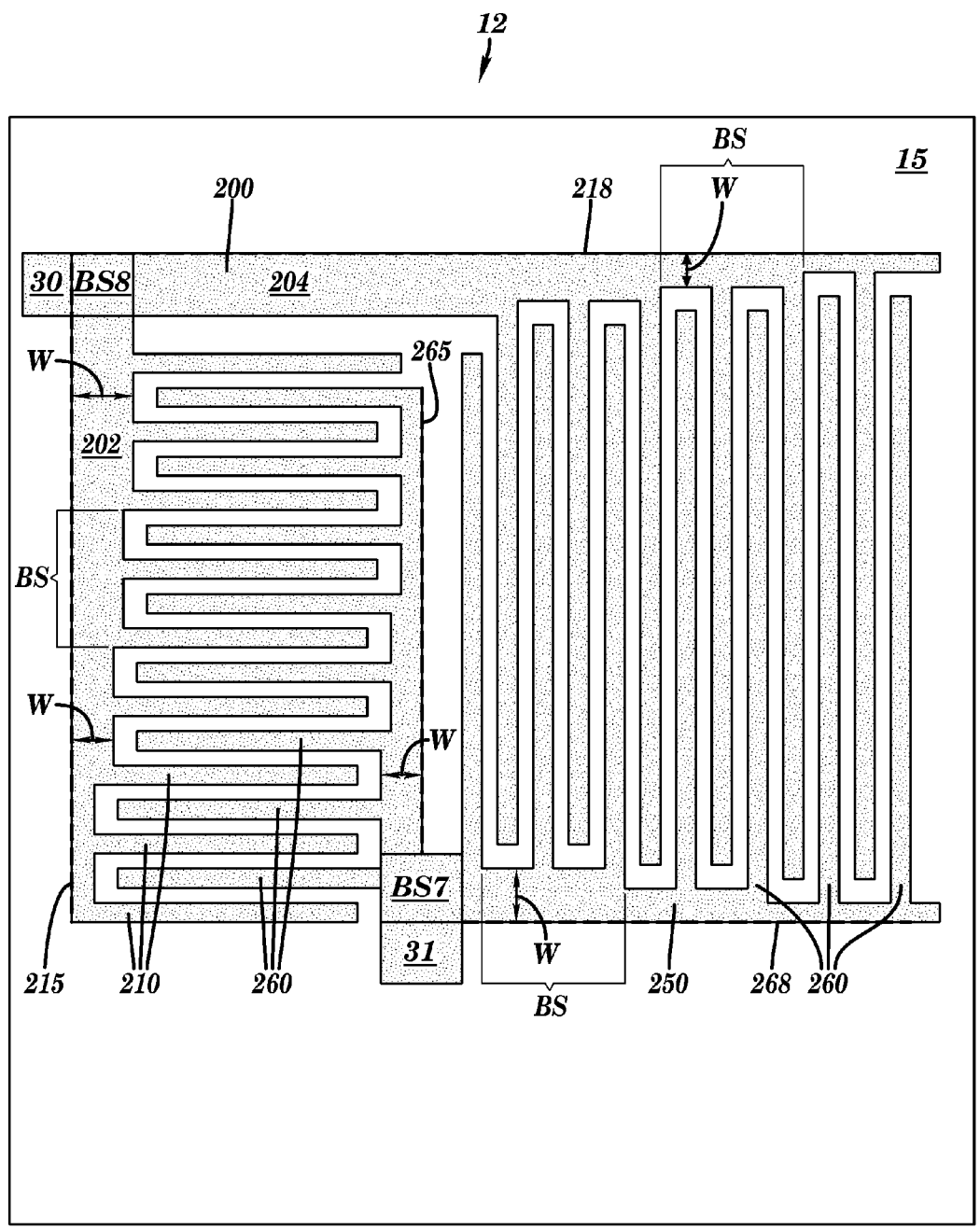
FIG. 13 depicts a plan view of another embodiment of a MFCAP, in accordance with aspects of the present invention.

As shown in FIG. 13, another embodiment of MFCAP 12 is depicted. MFCAP 12 may include a configuration in which in port 30 may be integrally connected to a corner bus segment BS8 of first bus 200 and out port 31 may be integrally connected to a corner bus segment BS7 of second bus 250. MFCAP 12 may also concurrently have first edge 215 and second edge 218 of first bus 200 substantially parallel to first edge 265 and second edge 268 of second bus 250 respectively.

Referring to embodiments of MFCAPs 10-12 previously described herein, MFCAPs 10-12 may exhibit an increase in a quality factor Q performance from approximately 15% to approximately 35% based on the configurations of MFCAPs 10-12, and in particular, wherein the buses are non-uniform across a length of the buses and/or the incorporation of bus segments BS of the buses wherein the bus segments BS increase in width W as they are more proximate to the respective in port and out port on each. In another embodiment, MFCAPs 10-12 may exhibit an increase in a quality factor Q performance of approximately 25% based on the configurations of MFCAPs 10-12.

Referring to embodiments of MFCAPs 10-12 previously described herein, MFCAPs 10-12 may also comprise a plurality of layers 15 wherein the plurality of layers 15 may be vertically stacked. In an embodiment, the plurality of layers 15 may be vertically stacked such that the interdigitated fingers of one layer may be substantially parallel to the interdigitated fingers of an adjacent stacked layer. In another embodiment, the plurality of layers 15 may be vertically stacked such that the interdigitated fingers of one layer may be substantially perpendicular to the interdigitated fingers of an adjacent stacked layer.

Embodiments of MFCAPs 10-12 previously described herein may have at least one via (not shown) to connect a first bus of two adjacent layers and may have at least one via to connect a second bus of two adjacent layers. In an embodiment, vias are used to interconnect each bus of each layer to a respective bus of an adjacent layer. The number of vias of used to connect the first bus of two adjacent layers need not be the same number used to connect the second bus of two adjacent layers. The number of vias needed may be determined without undue experimentation based on the length of each individual bus so as to ensure a proper interconnection exists between buses of different layers.

In an embodiment, MFCAPs 10-12 may include vias on the fingers thereon. There may be at least one via to connect a finger in one metal level and another via on a finger on an adjacent metal level where both fingers may be connected by a same node. In another embodiment, MFCAPs 10-12 may not include any vias on the fingers thereon.

Fingers, buses, and vias may comprise a conductive material, including but not limited to copper, aluminum, titanium nitride (TiN), doped polysilicon, and combinations thereof. The composition of one set of fingers may vary from that of another set of fingers, as may be the same for buses and vias. Dielectric material (not shown) may be used to fill the space between the fingers of the same or different layers. Materials that may be used include but are not limited to silicon dioxide (SiO$_2$), silicon nitride (SiN), tantalum pentoxide (Ta$_2$O$_5$), and combinations thereof. The choice of conductive materials may depend on the manufacturing process and the application of the MFCAP, and are known to one having ordinary skill in the art.

Embodiments of MFCAPs 10-12 previously described herein may be manufactured by techniques known in the art and may be manufactured at the same time as other circuits without any additional processing steps. For example, a first bus having a set of fingers; a second bus having a set of fingers; and a trench of another circuit feature may be on the same layer and may be concurrently manufactured at the same time. By the same token, vias of the first and the second bus as well as other vias of other circuit features may also be concurrently manufactured at the same time.

Figure 14A:
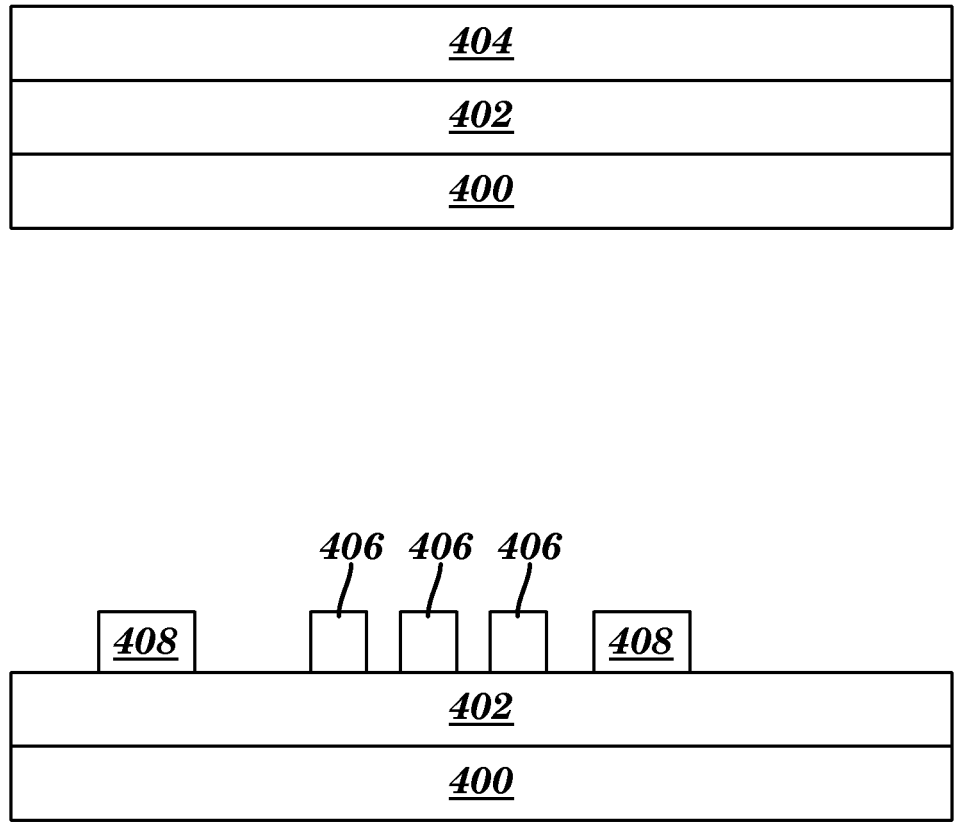
FIGS. 14A-14D depict an embodiment of a method for forming a MFCAP, in accordance with aspects of the present invention.

An embodiment of a method of forming a MFCAP is depicted in FIGS. 14A-14D, in accordance with aspects of the present invention. As shown in FIG. 14A, a metal layer 402 may be deposited on an isolation layer 400 by, for example, chemical vapor deposition (CVD) or physical vapor deposition (PCVD). In an embodiment, a layer of antireflective coating (not shown) may be optionally deposited over metal layer 402. A layer of photoresist 404 may then be formed over metal layer 402. Photoresist 404 may be later exposed through a mask (not shown) with a pattern including buses, interdigitated fingers, and other circuit elements, for example, a trench. The pattern may be developed on photoresist 404 which may then be removed except for photoresist areas of fingers 406 and buses 408. The uncovered area of metal layer 402 may then be etched away and the remaining photoresist 404 may be removed leaving interdigitated fingers 407 and buses 409 of the MFCAP and other features from metal layer 402 if desired (see FIG. 14B).

Figure 14B:
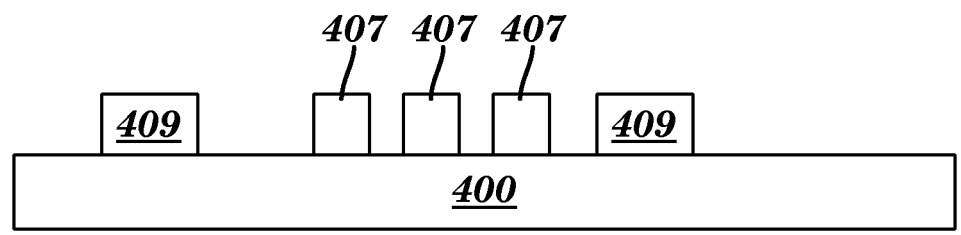
Figure 14B:
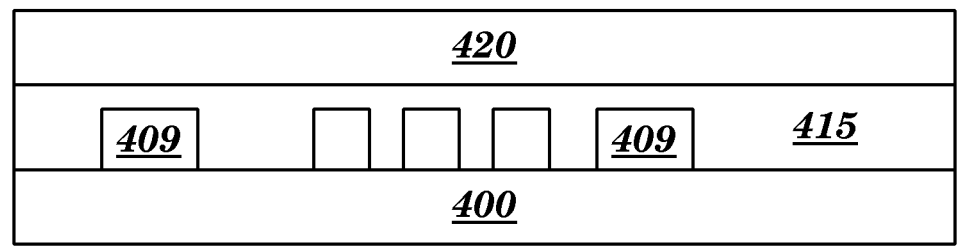

Additional process steps may be performed such that the MFCAP may include a plurality of vertically stacked layers. Referring to FIG. 14B, after fingers 407 and buses 409 are formed, a layer of inter-metal dielectric (IMD) 415 may be formed between fingers 407 and buses 409, and may cover all other vacant areas. The upper surface of IMD layer 415 may then be planarized by, for example, chemical mechanical polishing (CMP). Another layer of photoresist 420 may be formed over IMD layer 415. Following an exposure and development process, photoresist 420 on the area where vias are to be located may be removed and holes 425 are left (see FIG. 14C).

Figure 14C:
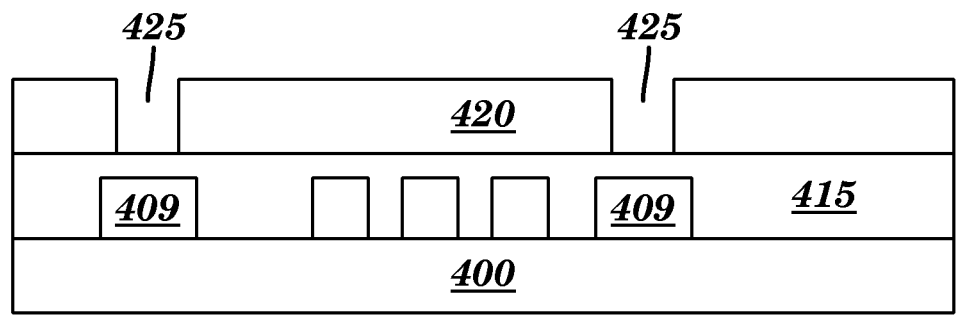
Figure 14C:
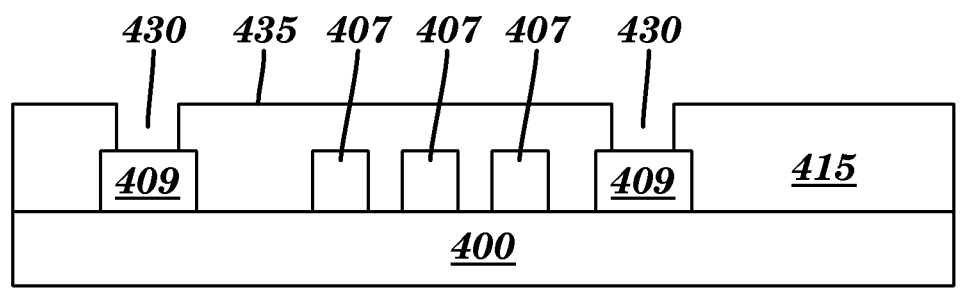

Referring to FIG. 14C, after etching, for example, holes 425 in IMD layer 415 down to at least the surface of the underlying features, conductive material may then be deposited and vias 430 may be formed. Surface 435 may then be planarized by, for example, CMP.

Figure 14D:
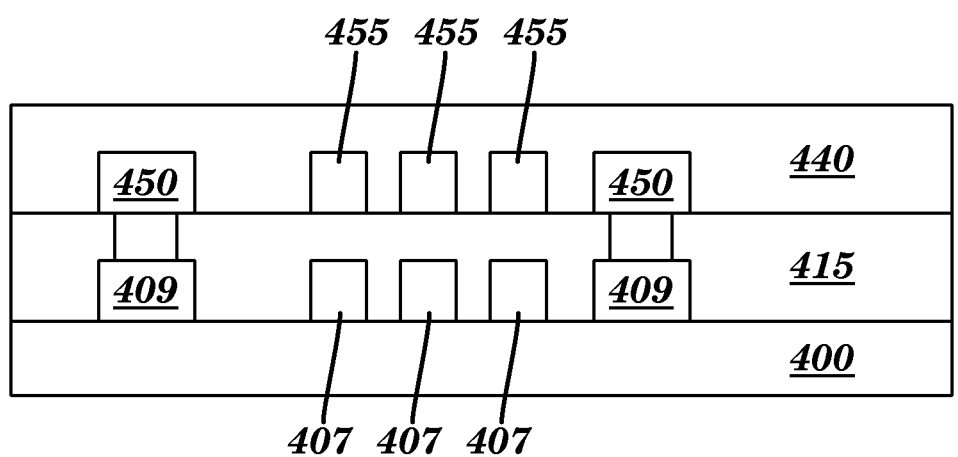

Referring to FIG. 14D, a second layer of metal may be deposited over IMD layer 415. Another layer of photoresist (not shown) may be formed on top of the second metal layer. After exposure, development, etching, and removing the remaining photoresist as previously described, fingers 455 and buses 450 of the second metal layer may be formed. In an embodiment, fingers 455 of the second layer may be substantially parallel to fingers 407 of the first layer. In another embodiment, fingers 455 of the second layer may be substantially perpendicular to fingers 407 of the first layer by using a photoresist on top of the second metal layer that is patterned to form perpendicular fingers 455.

A second IMD layer 440 may be formed between fingers 455 and all other vacant areas. Any number of additional layers having interdigitated fingers may be formed by repeating the aforementioned steps until a preselected number of layers are achieved.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person skilled in the art are intended to be included within the scope of the disclosure as defined by the accompanying claims.

What is claimed is:

1. A metal finger capacitor (MFCAP) comprising at least one layer, the at least one layer including:
    a first set of fingers, wherein each finger of the first set includes an end integrally connected to a first bus, the first bus including a plurality of first bus segments;
    a second set of fingers interdigitated with the first set of fingers,
    wherein each finger of the second set includes an end integrally connected to a second bus, the second bus including a plurality of second bus segments; and
    an in port integrally connected to the first bus and an out port integrally connected to the second bus;
    wherein a width of the first and second bus is non-uniform across a length of the first and second bus, and
    wherein a width of each of the first bus segments is based on a proximity to the in port, the width of all of the first bus segments increasing the more proximate each of the first bus segments is to the in port, and
    wherein a width of each of the second bus segments is based on a proximity to the out port.

2. The MFCAP according to claim 1, wherein the in port and the out port are integrally connected to bus segments approximately centered on the length of the first and second bus,
    wherein a second edge of the first bus is substantially parallel to a second edge of the second bus, and
    wherein each bus segment in the plurality of first bus segments is directly connected to at least one finger in the first set of fingers.

3. The MFCAP according to claim 1, wherein the plurality of first bus segments are connected to the first set of fingers.

4. The MFCAP according to claim 1, wherein the in port is integrally connected to a first edge and a first end bus segment of the first bus, and the out port is integrally connected to a first edge and a first end bus segment of the second bus, and wherein a first edge of the first bus is substantially parallel to a first edge of the second bus.

5. The MFCAP according to claim 1, wherein the in port is integrally connected to a first edge and a second end bus segment of the first bus, and the out port is integrally connected to a first edge and a first end bus segment of the second bus, and wherein a first edge of the first bus is substantially parallel to a first edge of the second bus.

6. The MFCAP according to claim 1, wherein the width of each of the first bus segments is proportional to a proximity of the first bus segment to the in port, and the width of each of the second bus segments is proportional to a proximity of the second bus segment to the out port.

7. The MFCAP according to claim 1, wherein the in port is integrally connected to a first edge of a second end bus segment of the first bus, and the out port is integrally connected to a first edge of a first end bus segment of the second bus, and wherein a first edge of the first bus is substantially parallel to a first edge of the second bus.

8. The MFCAP according to claim 1, wherein the in port is integrally connected to a first arm of a first end bus segment of the first bus, and the out port is integrally connected to a first arm of a first end bus segment of the second bus, and wherein a first edge of the first bus is substantially parallel to a first edge of the second bus.

9. The MFCAP according to claim 1, wherein the first bus includes a first, a second, and a third section, and the second bus is approximately centered between the first and third section of the first bus,
wherein the first section has a first width,
wherein the second section has a second width, and
wherein the third section has a third width.

10. The MFCAP according to claim 9, wherein the in port is integrally connected at approximately a center of a length of the second section of the first bus, and the out port is integrally connected to a first end bus segment of the second bus,
wherein the first width is smaller than the second width, and the third width is larger than the second width, and
wherein a first edge and a fourth edge of the first bus are substantially parallel.

11. The MFCAP according to claim 1, wherein a width of the plurality of second bus segments increases based on the proximity to the out port.

12. The MFCAP according to claim 11, wherein the in port is integrally connected to and approximately centered on a length of a first section of the first bus, and the out port is integrally connected to a corner segment of the second bus, and wherein a first edge and a second edge of the first bus are substantially parallel to a first edge and second edge respectively of the second bus.

13. The MFCAP according to claim 11, wherein the in port is integrally connected to a corner segment of the first bus, and the out port is integrally connected to a corner segment of the second bus, and wherein a first edge and a second edge of the first bus are substantially parallel to a first edge and second edge respectively of the second bus.

14. The MFCAP according to claim 1, wherein the MFCAP additionally comprises a plurality of layers, the plurality of layers being vertically stacked such that a first and a second set of interdigitated fingers of each layer are substantially parallel to a first and a second set of interdigitated fingers of each adjacent layer.

15. The MFCAP according to claim 14, wherein the plurality of vertically stacked layers are interconnected by conductive vias.

16. The MFCAP according to claim 15, wherein the conductive vias are located on the interdigitated fingers.

17. The MFCAP according to claim 14, wherein the plurality of vertically stacked layers include a dielectric layer therebetween.

18. The MFCAP according to claim 1, wherein the MFCAP additionally comprises a plurality of layers, the plurality of layers being vertically stacked such that a first and a second set of interdigitated fingers of each layer are substantially perpendicular to a first and a second set of interdigitated fingers of each adjacent layer.

19. A metal finger capacitor (MFCAP) comprising at least one layer, the at least one layer including:
a first set of fingers, wherein each finger of the first set includes an end integrally connected to a bus segment of a first bus;
a second set of fingers interdigitated with the first set of fingers, wherein each finger of the second set includes an end integrally connected to a bus segment of a second bus; and
an in port integrally connected to the first bus and an out port integrally connected to the second bus;
wherein the first bus and the second bus include a plurality of bus segments and widths of bus segments of the first and the second buses are non-uniform across a length of the first and second bus, and
wherein a width of each of the bus segments of the first bus is increased the more proximate each bus segment is to the in port.

20. A metal finger capacitor (MFCAP) comprising at least one layer, the at least one layer including:
an in port disposed on the at least one layer;
a first bus integrally connected to the in port, the first bus including a plurality of first bus segments,
wherein a width of each of the first bus segments is related to a proximity to the in port, the width of each of the first bus segments decreasing in relation to an increase in distance from the in port;
a second bus proximate to the first bus;
an out port integrally connected to the second bus;
a first set of fingers,
wherein each finger of the first set includes an end integrally connected to at least one first bus segment of the first bus, and
wherein each of the first bus segments is directly connected to at least one finger in the first set of fingers; and
a second set of fingers interdigitated with the first set of fingers,
wherein each finger of the second set includes an end integrally connected to the second bus.

\* \* \* \* \*